Dec. 14, 1937.    G. SACHSENRÖDER    2,101,958
ARTIFICIAL SAUSAGE CASING AND PROCESS FOR MAKING SAME
Filed May 23, 1934
Fig.1
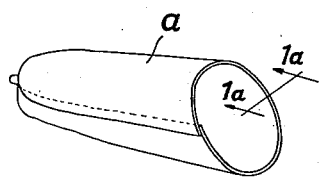
Fig.1a    Fig.2    Fig.3    Fig.4
 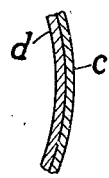 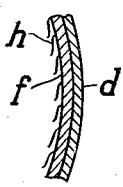 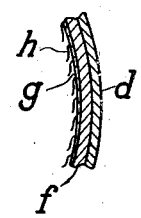
Inventor.
GUSTAV SACHSENRÖDER,
BY
Toulmin & Toulmin
Attorneys Patented Dec. 14, 1937

2,101,958

UNITED STATES PATENT OFFICE 2,101,958

ARTIFICIAL SAUSAGE CASING AND PROCESS FOR MAKING SAME

Gustav Sachsenröder, Wuppertal-Barmen, Allee, Germany

Application May 23, 1934, Serial No. 727,074
In Germany December 7, 1932

14 Claims. (Cl. 99—176)

This invention relates especially to the manufacture of sausage casings from hydrated fibrous material, that is to say, from long sheets of paper that are either parchmentized or vulcanized. There have been sausage casings made of such like hydrated fibrous material previously, but hitherto such sausage casings have only been used made of fibrous material hydrated only to a slight degree. Such sausage casings have never been very extensively used as in actual practice they have proved impractical because they are liable to burst easily on their being subjected to a certain amount of pressure during the process of filling. These prior sausage casings also had the unsatisfactory property of not sufficiently adhering to the sausage material in the event of the latter shrinking.

One object of my invention is to provide an artificial sausage casing made from hydrated fibrous material which is hydrated to such an extent that its extensibility is increased to an unprecedented amount.

Another object is to provide such an artificial sausage casing composed of several already hydrated layers united to one another in a substantially non-separable manner.

Another object is to provide an artificial sausage casing hydrated fibrous material which has been subjected at least twice to a complete hydration process.

Another object is to provide an artificial sausage casing of hydrated fibrous material having an interior surface provided with bibulous nonhydrated fibers, the outer layer having been hydrated one or more times.

Another object is to provide such an artificial sausage casing wherein the interior surface has been provided with an adhesive material, such as gelatine.

The invention is exemplified in the drawing as follows:

Figure 1 is a perspective view showing a sausage casing made of a single layer of hydrated fibrous material, according to the present invention.

Figure 1a is an enlarged section along the line 1a—1a of Figure 1.

Figure 2 is an enlarged cross-sectional view showing a portion of a sausage casing made of a plurality of layers of hydrated fibrous material united with one another, taken along a line similar to the line 1a—1a of Figure 1.

Figure 3 is an enlarged cross-sectional view similar to Figure 2, but showing a portion of a sausage casing consisting of an outer layer of hydrated fibrous material and an inner layer which is hydrated only on the side on which it is united with the outer layer, but not on its interior.

Figure 4 is an enlarged cross-sectional view similar to Figure 2, but showing a portion of a sausage casing provided inside with a layer of gelatine.

Referring to Figure 1 of the drawing in detail, $a$ denotes a sausage casing made of a single layer of hydrated fibrous material so strongly parchmentized that it is of a skin-like translucent consistency. This can be effected, for instance, by subjecting the fibrous material, after it has once been completely hydrated, to a second hydrating process.

In Figure 2 there are shown two layers $c$ and $d$ of hydrated fibrous material, which are united one with the other by a hydrating fluid in such a way that outwardly no difference between the layers is discernible.

In Figure 3 there is shown a portion of an outer sausage casing consisting of one or several layers of fibrous material, in which there is provided a further thin layer $f$, hydrated together on the one side with the layer $d$, but having on its inner side bibulous, loose, non-hydrated fibers $h$.

In Figure 4 there is represented a portion of a sausage casing according to Figure 3, but additionally provided inside the layer $f$ with a layer of gelatine $g$, which unites closely with the sausage material.

The layers $a$ to $g$ are arranged close together without space between them so that in assembly they form a casing which has a thickness substantially like the thickness of natural gut.

According to the present invention a substantially greater strength of the sausage casing or tegument is attained by using only such sausage casings of hydrated fibrous material as have a lateral extensibility (that is to say, at the periphery of the casing) of more than twenty-five percent. In general, the standard will here be an extensibility of thirty percent and upwards. An extensibility of the degree required occurs when the hydrated fibrous mass possesses a skin-like translucent consistency. Such a consistency furthermore gives the finished sausage an appearance in nowise distinguishable from a sausage made of natural gut. Preferably, sausage casings are used whose elasticity is still further increased by their being hydrated several times successively. Several already hydrated layers can also be united with one another. This may be effected, for instance, in a manner known, by the layers being parchmentized onto one another. In the case that the fibrous material is to be subjected several times successively to a hydration process, it is given an extensibility which can be raised to sixty percent or over. Hitherto a second hydration has not been carried out in succession to the first, but has been interrupted by the carrying out of other different process steps between the hydration steps.

In order to insure the sausage casing of hydrated fibrous material adhering well to the sausage filling when the latter shrinks, there are further provided by the present invention, on the interior surface of the sausage casing, bibulous non-hydrated fibers $h$. This can be effected, for instance, by the interior surface of the sausage casing being strewn, before it is made into a closed tube, with loose fibers, e. g. by means of a shaking sieve, the interior surface of the sausage casing being spread over with a hydrating liquid. The interior surface can also be provided with bibulous non-hydrated fibers, by the usual absorbent, parchmentizing or other hydrating bath only on one side, so that the hydration takes place only from the one side, while the other side retains substantially its original consistency. The interior surface of the sausage casing can also be covered with a bibulous non-hydrated fibrous layer. To accomplish this, for instance, an already hydrated long sheet of paper is provided anew with a hydrating fluid and then a long, thin sheet of absorbent paper is laid on this hydrated long sheet and united with it, whereby the hydrating fluid is to be measured out in such small quantity that it does not penetrate through to the other side of the thin fibrous layer. The inner surface of the sausage casing can also be provided with an adhesive material, such for example as, a gelatine layer $g$, which adheres to the inner fibrous layer of the sausage casing and on the other hand, unites well with the sausage filling.

The invention also enables hydrated fibrous material to be employed as a really usable artificial casing material in such wise that no bursting of the sausage skin is to be feared even during the stuffing process, and that furthermore when the sausage material shrinks, the sausage casing clings closely to it so that the artificial casing material is in nowise to be distinguished from natural gut. Even when the sausage is cut any difference, if it exists, is so trifling as not to be at all apparent to the user.

The artificial casing material of my invention, from a hygienic point of view, thus possesses several extraordinary advantages over natural gut.

By the term "extensibility", as used herein, is meant the ratio of stretch to original length.

It will be understood that I desire to comprehend within my invention such modifications as may be necessary to adapt it to varying conditions and uses.

I claim:

1. A sausage casing of hydrated fibrous paper which is hydrated to such a degree that its lateral extensibility at the periphery of the casing in the wet state exceeds 25 per cent.

2. A sausage casing of hydrated fibrous paper, consisting of an outer hydrated layer, and an inner fibrous layer united with the outer layer and bearing on its inner side, after its union with the outer layer, bibulous non-hydrated fibers.

3. A sausage casing consisting of a plurality of layers of hydrated paper united with one another in a substantially non-separable manner and hydrated to such a degree that the lateral extensibility at the periphery of the casing in the wet state exceeds twenty-five per cent.

4. In a sausage casing, a tubular member with an interior surface having bibulous non-hydrated fibers.

5. A sausage casing having an internal layer of bibulous non-hydrated fibers.

6. A sausage casing according to claim 4, having a layer of adhesive material on the inner surface thereof.

7. A sausage casing according to claim 4, having a layer of gelatine on the inner surface thereof.

8. A sausage casing of hydrated fibrous paper according to claim 1, which is so strongly hydrated that it has a skin-like translucent consistency.

9. A sausage casing consisting of at least two layers which are positively united, the innermost layer bearing on its inner side bibulous non-hydrated fibers substantially over the whole inner surface.

10. A sausage casing having an inner surface with bibulous non-hydrated fibers arranged substantially over the whole said surface.

11. A process for the manufacture of a sausage casing of hydrated paper comprising at least two complete hydrating processes in succession and a washing process intermediate two succeeding hydrating processes, the procedure being continued until the paper is hydrated to such a degree that its lateral extensibility at the periphery of the casing in the wet state exceeds twenty-five per cent.

12. A process for the manufacture of a sausage casing of hydrated paper comprising at least two complete hydrating processes in succession and a washing process intermediate two succeeding hydrating processes, the procedure being continued until the paper has a skin-like translucent consistency, and a lateral extension of at least 25 per cent.

13. A process for the manufacture of hydrated paper casing comprising at least two complete hydrating processes in succession and a washing process intermediate two succeeding hydrating processes, the procedure being continued until the paper is hydrated to such a degree that its lateral extensibility at the periphery of the casing in the wet state exceeds twenty-five per cent.

14. A process for the manufacture of hydrated paper casing comprising at least two complete hydrating processes in succession and a washing process intermediate two succeeding hydrating processes, the procedure being continued until the paper has a skin-like translucent consistency, and a lateral extension of at least 25 per cent.

GUSTAV SACHSENRÖDER.